United States Patent
Duong et al.

(10) Patent No.: US 9,963,974 B2
(45) Date of Patent: May 8, 2018

(54) REDUCTION OF EQUALLY SPACED TURBINE NOZZLE VANE EXCITATION

(71) Applicant: UNITED TECHNOLOGIES CORPORATION, Hartford, CT (US)

(72) Inventors: Loc Quang Duong, San Diego, CA (US); Xiaolan Hu, San Diego, CA (US); Gao Yang, San Diego, CA (US); Steven R. Falconer, Escondido, CA (US); Ralph E. Gordon, San Diego, CA (US); Jesus A. Garcia, San Diego, CA (US); Dan G. Sapiro, Poway, CA (US); Ulrike Kaul, El Cajon, CA (US); Gregory G. Johnson, San Diego, CA (US); Benjamin E. Fishler, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 1145 days.

(21) Appl. No.: 13/658,184

(22) Filed: Oct. 23, 2012

(65) Prior Publication Data

US 2014/0112760 A1    Apr. 24, 2014

(51) Int. Cl.

| | |
|---|---|
| *F01D 5/16* | (2006.01) |
| *G01M 13/00* | (2006.01) |
| *F01D 5/00* | (2006.01) |
| *F01D 5/14* | (2006.01) |
| *F01D 9/04* | (2006.01) |
| *B23P 6/00* | (2006.01) |

(52) U.S. Cl.
CPC ............... *F01D 5/16* (2013.01); *F01D 5/005* (2013.01); *F01D 5/141* (2013.01); *F01D 9/04* (2013.01); *G01M 13/00* (2013.01); *F05D 2240/122* (2013.01); *F05D 2260/81* (2013.01); *Y10T 29/49318* (2015.01)

(58) Field of Classification Search
CPC . F01D 5/005; F01D 5/10; F01D 5/141; F01D 5/142; F01D 5/16; F01D 5/26;
(Continued)

(56) References Cited

U.S. PATENT DOCUMENTS

| | | |
|---|---|---|
| 3,169,974 A | 2/1965 | Kohn |
| 4,108,573 A | 8/1978 | Wagner |

(Continued)

FOREIGN PATENT DOCUMENTS

EP    1375826 A1    1/2004

OTHER PUBLICATIONS

Canadian Office action for Canadian Patent Application No. 2,888,919, dated May 9, 2016.

*Primary Examiner* — Jason Shanske
*Assistant Examiner* — Alexander White
(74) *Attorney, Agent, or Firm* — Bachman & LaPointe, P.C.

(57) ABSTRACT

A reduction in excitation amplitudes affecting turbine blade durability in a turbine nozzle assembly having a plurality of vanes and turbine blades, includes: identifying a turbine blade design of the turbine nozzle assembly; performing a modal model analysis of at least one of the turbine blades in the turbine blade design; reducing aerodynamic impact by ensuring that each of the turbine blades is free of aero-excitation from an upstream flow at the vanes in an operating speed range; identifying blade natural frequencies with respect to the nozzle vanes; and modifying a trailing edge of at least one of the vanes to reduce the excitation amplitudes.

10 Claims, 5 Drawing Sheets

(58) Field of Classification Search
CPC .... F01D 25/04; F01D 25/06; F05D 2240/122; F05D 2260/96; F05D 2260/961; G01M 13/00; Y10T 29/49318
See application file for complete search history.

(56) References Cited

U.S. PATENT DOCUMENTS

| | | | |
|---|---|---|---|
| 6,932,565 B2 * | 8/2005 | Garrett | F01D 5/141 415/119 |
| 7,252,481 B2 | 8/2007 | Stone | |
| 2005/0271513 A1 | 12/2005 | Johann | |
| 2006/0078422 A1 | 4/2006 | Morris et al. | |
| 2007/0033802 A1 * | 2/2007 | McKeever | G06F 17/5095 29/889.7 |
| 2009/0155082 A1 * | 6/2009 | Duong | F01D 5/005 416/223 A |
| 2010/0050594 A1 * | 3/2010 | Lombard | F01D 5/142 60/204 |
| 2011/0274537 A1 | 11/2011 | Duong et al. | |
| 2011/0293422 A1 * | 12/2011 | Gupta | F01D 5/145 416/95 |

\* cited by examiner

Modified velocity diagram

REDUCTION OF EQUALLY SPACED TURBINE NOZZLE VANE EXCITATION

BACKGROUND

The present disclosure relates to a method for reducing the excitation amplitudes in order to improve turbine blade durability and to turbomachinery created using the method.

Some engines are subjected to a number of unscheduled removals due to the effects of high cycle fatigue on certain turbine blades. One contributor to this is a nozzle vane trailing edge at an extreme end of the manufacturing dimensional tolerance, which generates a forcing function whose amplitude exceeds an intended design limit.

In another engine, the cause of a radial turbine scallop failure was traced back to the resonance of the blade excited by the turbine nozzle vanes. Broken turbine fragments travel through the exhaust assembly resulting in an uncontained exit. The strong amplitude of the excitation force leads to blade dynamic stresses exceeding the material strength capability.

There remains a need for a way to reduce excitation amplitudes so as to improve turbine blade durability.

SUMMARY

In accordance with the present disclosure, there is provided a method for reducing excitation amplitudes affecting turbine blade durability in a turbine nozzle assembly having a plurality of vanes and turbine blades, which broadly comprises the steps of: identifying a turbine blade design of the turbine nozzle assembly; performing a modal model analysis of at least one of the turbine blades in the turbine blade design using a computer; reducing aerodynamic impact by ensuring that each of the turbine blades is free of aero-excitation from an upstream flow at the vanes in an operating speed range; identifying blade resonator frequencies with respect to the nozzle vanes using said computer; and determining at least one modification to a trailing edge of at least one of said vanes to reduce said excitation amplitudes.

In another and alternative embodiment, the at least one modification to the trailing edge determination comprises altering an angle at which a flow of gas enters the turbine blades and interrupts energy build up.

In another and alternative embodiment, the at least one modification to the trailing edge determination comprises performing a computational fluid dynamics (CFD) analysis to determine a vane exit angle resulting in maximum pressure perturbance and minimizing $P(\omega)$.

In another and alternative embodiment, the method further comprises guiding a modification of the vane exit angle in a direction of shifting blade pressure loading toward a leading edge of the at least one turbine blade away from a blade anti-node.

In another and alternative embodiment, the method further comprises performing a CFD analysis to determine an air bleed angle resulting in maximum pressure perturbance and in minimizing the $P(\omega)$.

In another and alternative embodiment, the method further comprises limiting a number of air bleeds distributed in a tangential direction.

In another and alternative embodiment, the air bleeds are through at least one of a turbine shroud and modification of an internal vane cooling system.

In another and alternative embodiment, the method further comprises performing a CFD analysis to determine an air bleed angle resulting in maximum perturbance and in minimizing $P(\omega)$.

In another and alternative embodiment, the trailing edge modifying step comprises modifying the trailing edge in a spanwise direction.

In another and alternative embodiment, the trailing edge modifying step comprises modifying an airfoil with the trailing edge to have a reduced chord.

In another and alternative embodiment, the trailing edge modifying step comprises including cut back portions in the trailing edge.

In another and alternative embodiment, the trailing edge modifying step comprises including an arcuate portion in the trailing edge.

Further in accordance with the present disclosure, there is provided turbomachinery which broadly comprises at least one turbine blade with a blade natural frequency configured to cause a build up of energy based on an excitation amplitude and at least one nozzle vane having a trailing edge which is modified to reduce the excitation amplitude.

In another and alternative embodiment, the trailing edge of the at least one nozzle vane is modified to reduce the chord of an airfoil portion of the at least one nozzle vane.

In another and alternative embodiment, the trailing edge of the at least one nozzle vane includes a plurality of cutback portions.

In another and alternative embodiment, the trailing edge of the at least one nozzle vane includes an arcuate shaped region.

Other details of the technique for reducing excitation in equally spaced turbine nozzle vanes are set forth in the following detailed description and the accompanying drawings wherein like reference numerals depict like elements.

DETAILED DESCRIPTION

Figure 1:
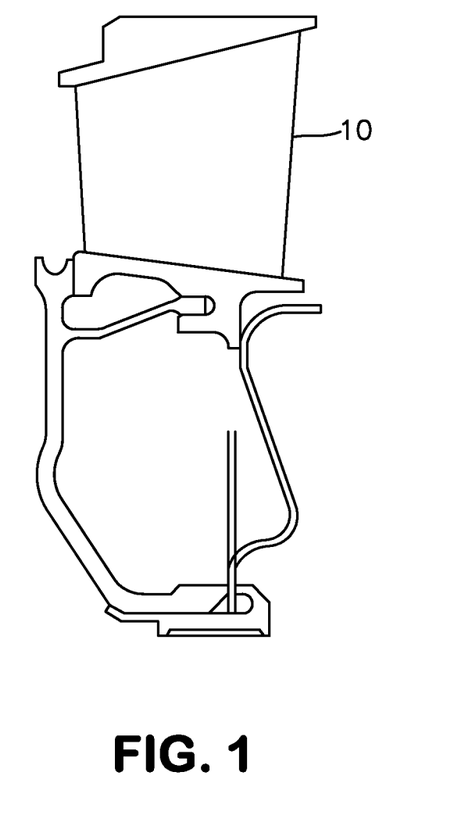
FIG. 1 illustrates an axial turbine nozzle.
Figure 2:
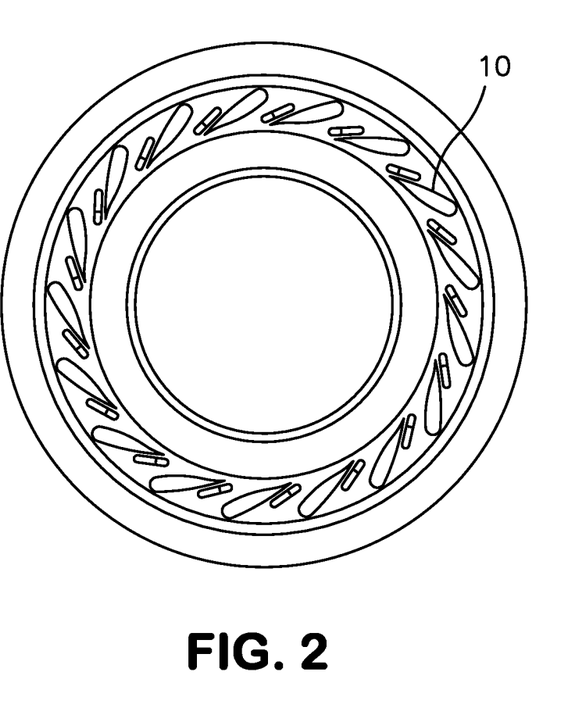
FIG. 2 illustrates a radial turbine nozzle.

The present disclosure is related to both axial and radial turbine nozzle assembly configurations of contour profile as illustrated in FIGS. 1 and 2 respectively and of similar structures. The nozzle assemblies feature a number of vanes 10 placed in tangential direction, clockwise or counter-clockwise. The method described herein is a method for influencing the aerodynamic excitation amplitude on a given blade mode of vibration by reducing the amplitudes of the coefficients of the Fourier series representing the aerodynamic forcing function. This reduction in excitation amplitude in frequency ranges of interest is based upon the platform of (1) aero-mechanical interaction; (2) structural eigenvalue; and (3) Fourier series operations.

The hot section of a gas turbine engine, either axial or radial, consists of a combustor (not shown) and one or more multiple stage turbines. Each turbine stage involves a stator, called nozzle, and a rotor or turbine wheel. The turbine blades 32 of FIG. 3 on the rotor interact with the fluid in the gas flow path.

Figure 3:
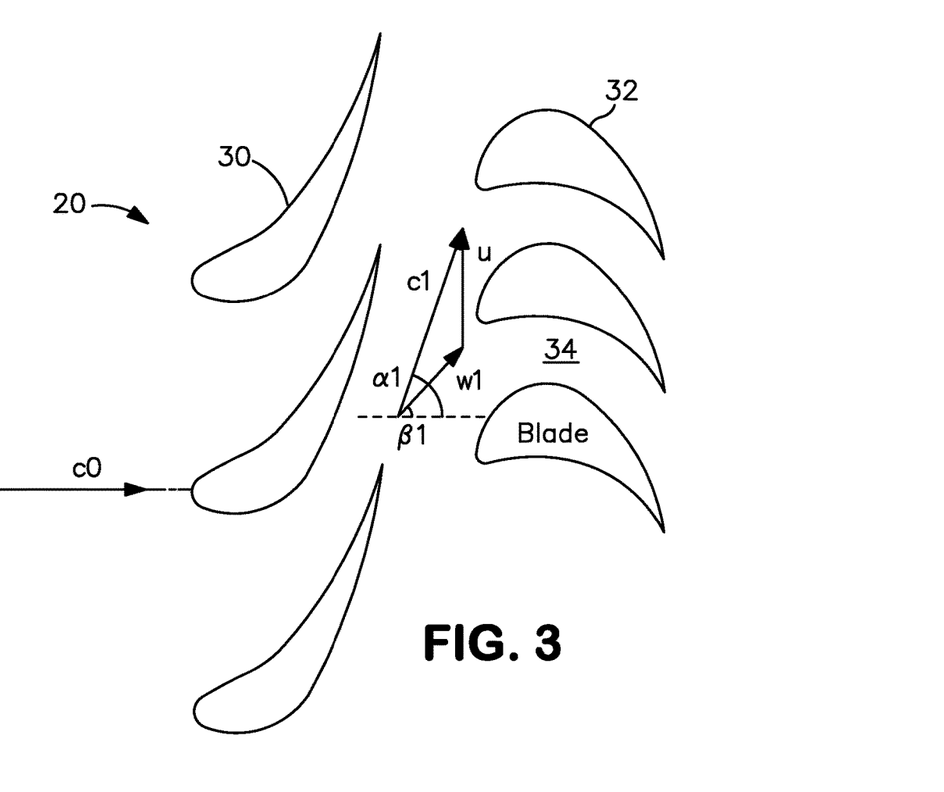
FIG. 3 is a velocity diagram.

The turbine wheel represents a complex rotating structure consisting of a number of turbine blades 32 attached to a rotor. Within a frequency spectrum of interest, each type of turbine blade 32, axial or radial, has a number of natural frequencies. The turbine is subjected to resonant vibration if the natural frequencies of the turbine blades 32 coincide with the aero-excitation frequencies from the unsteady fluid pressure as the fluid flows pass through non-rotating components such as the turbine nozzle guide vanes 30, which are present upstream of the turbine wheel.

The turbine nozzle assembly 20 of a gas turbine engine comprises n vanes 30. Typically, these vanes 30 are equally spaced in the circumferential direction. The nozzle assembly 20 with n vanes 30 generates an unsteady pressure field exciting source of n engine order (nEO).

Representing the turbine blade system continuum, by a matrix of discrete mass, the modal tuning of the turbine blade airfoils may be processed by first determining the bladed-disc system natural frequency.

To evaluate the response of the turbine blade structure to the excitation source a reduced modal model is needed. If one considers x(t) as a linear combination of a limited number of k interested orthogonal mode shapes, then:

$$x = \sum_k \phi_k q_k = [\Phi] \quad (1)$$

Where $\varphi$ is the normal modes; and q is the normal or modal coordinates.

Neglecting the effects of damping and expressing in normal coordinates:

$$[\Phi]^T[M][\Phi]\{q''\}+[\Phi]^T[K][\Phi]\{q\}=[\Phi]^T\{P(\omega)\} \quad (2)$$

Where $\{P(\omega)\}$ is the Fourier transform of $\{P(t)\}$, the forcing function.

From Eq. (2), the response of each blade mode to each of the excitation sources of engine order can be evaluated independently.

In an embodiment, the aero-dynamic impact, expressed in terms of blade vibratory stresses, is reduced by influencing the right hand side of equation (2), namely the term $P(\omega)$. The level of interaction between fluid and turbine blade could be measured from the amount of energy transferring from fluid to turbine blade. The aerodynamic work per cycle of blade motion is taken as the time integration of the dot product of the pressure (P) and the blade velocity ( ) in one period (T) of displacement over the blade area (A) as expressed in Eq. (3):

$$W = \int_C^T \left\{ \oiint [-P\vec{n}\dot{X}dA] \right\} dt \quad (3)$$

To reduce the blade dynamic stress at a particular blade natural frequency, the fluid energy transferring to blade at that corresponding blade natural frequency must be reduced or prevented from building up in each revolution such that the state of stress (High Cycle Fatigue (HCF)-Low Cycle Fatigue (LCF) interaction) is under the material allowable curve for the intended design.

In an embodiment, for existing hardware having equally spaced vane distribution, the non-harmonic tangential pressure distribution may be used as an indicator. An embodiment includes interrupting the periodic/cyclic dynamic pressure flow field such that build up of energy extracted by the turbine blade is disrupted. As a consequence, blade dynamic stress is kept below the material allowable limit.

For illustration, consider an axial turbine nozzle design configuration which comprises n equally spaced vanes. Also, assume that the blade has a natural frequency corresponding to nEO.

Referring now to FIG. 3, there is shown a flow velocity diagram. Hot gas from the combustor enters the row of nozzle vanes 30 with a static pressure and temperature, represented by $p_0$ and $T_0$ respectively, and an absolute velocity $C_0$. Through the nozzle 20, the gas is expanded to $p_1$ and $T_1$ with an increase in absolute velocity $C_1$. The gas exits the vane at angle $\alpha_1$, and then enters the row of turbine blades 32 with a relative velocity $W_1$ at an angle $\beta_1$. The row of turbine blades 32 is rotating with a tangential velocity U in the absolute frame of reference.

The state of pressure in the rotor blade passage 34 can be expressed in complex notation as:

$$P_T = P_0 + iP_1 \quad (4)$$

where $P_T$ is the total pressure, $P_0$ is the average steady state pressure and $P_i$ represents the unsteady pressure, which is a pressure that varies.

The unsteady pressure in this context is generated by n nozzle vanes 30 immediately upstream of the row of turbine blades 32. In one revolution, a blade will experience n wakes. This corresponds to an excitation of n Engine Order (nEO). Since the blade has a natural frequency corresponding to nEO, it will be operating under the state of resonance.

Expressing Eq. (4) in time domain, the periodic non-sinusoidal forcing function of the unsteady pressure corresponding to the un-modified (symmetric) nozzle configuration with n equally spaced vanes, can be expressed in terms of the Fourier series of sine function in the frequency range of interest as:

$$P_T(t) = P_0 + \ldots + a_n \sin\{n(EO)t + \psi_n\} + \ldots \quad (5)$$

Where $a_n$ and $\psi_n$ are maximum amplitude and phase angle, corresponding to nEO, respectively.

Figure 5:
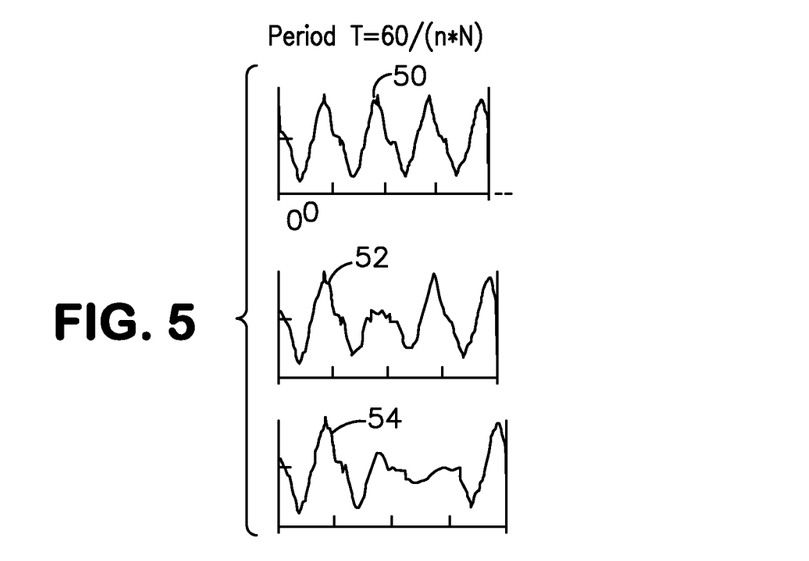
FIG. 5 illustrates pressure distribution on a blade for an unmodified vane trailing edge, one modified vane trailing edge, and two adjacent modified vane trailing edges.

FIG. 5 illustrates the periodic non-sinusoidal forcing function in one revolution as line 50.

To prevent the continuous building up of energy extracted from fluid to blade, disturbance must be introduced. FIGS. 4A-4F and FIG. 5 illustrate the introduction of disturbance into the periodic non-sinusoidal function in one revolution. The local flow field disturbance is achieved through disturbance in the vane exit angle $\alpha_1$. In other words, by geometrically modifying the original nozzle vane trailing edge (TE) 42 to a modified trailing edge 44, energy extracted by the blade is disrupted from building up resulting in blade dynamic stress level below the material allowable limit. Different manufacturing methods can be used to modify the existing hardware nozzle vane exit angle $\alpha_1$, such as: (1) electrical discharged machining (EDM) and (2) grinding.

Line 52 in FIG. 5 illustrates the interruption of the periodic non-sinusoidal forcing function in one revolution when one vane is modified. Under this condition, the original Fourier pressure forcing function becomes $$P(t) = P_0 + \ldots + b_{n-1} \sin\{(n-1)(EO)t + \psi_{n-1}\} + b_n \sin\{n(EO)t + \psi_n\} + B_{n+1} \sin\{(n+1)(EO)t + \psi_{n+1}\} + \ldots \quad (6)$$

With respect to the frequency of interest (nEO, excitation frequency corresponding to blade natural frequency), the flow enters the turbine blade at a different angle $\beta_1$ and with proper tuning of $\alpha_1$, such that:

$$a_n > b_n; a_n > b_{n-1}; \text{ and } a_n > b_{n+1} \quad (7)$$

In an embodiment when there are two modified vanes adjacent to each other, there is an additional interruption to the build up of energy. Line 54 of FIG. 5 illustrates the interruption on the harmonic of the forcing function caused by 2 adjacent modified vanes TE.

Figure 4A:
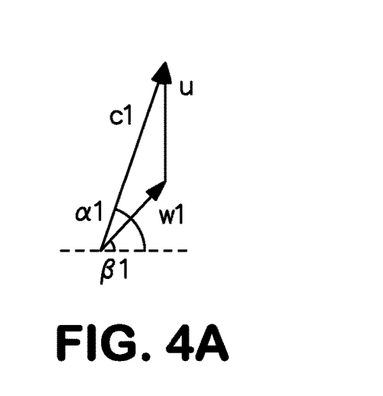
FIG. 4A illustrates a velocity diagram for an unmodified vane trailing edge.
Figure 4B:
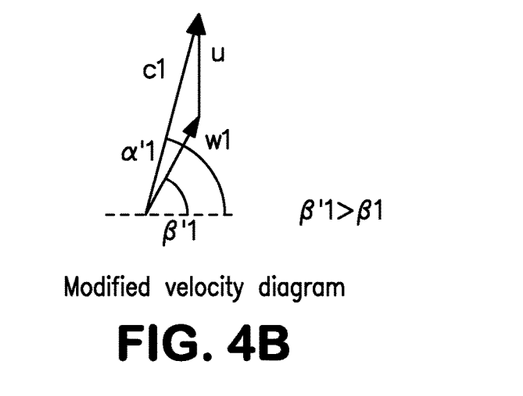
FIG. 4B illustrates a velocity diagram for a modified vane trailing edge.
Figure 4C:
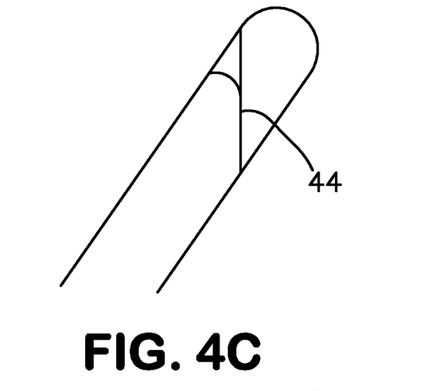
FIG. 4C illustrates an end contour fillet radius.
Figure 4D:
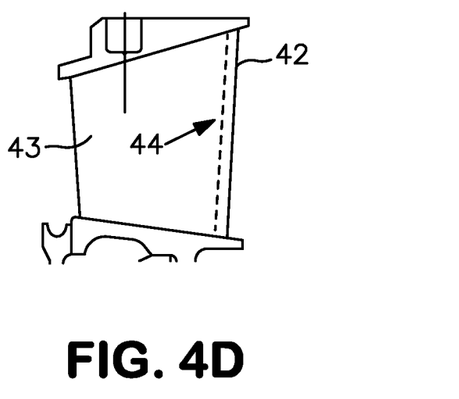
FIGS. 4D-4F illustrate various modifications to vane trailing edge.
Figure 4E:
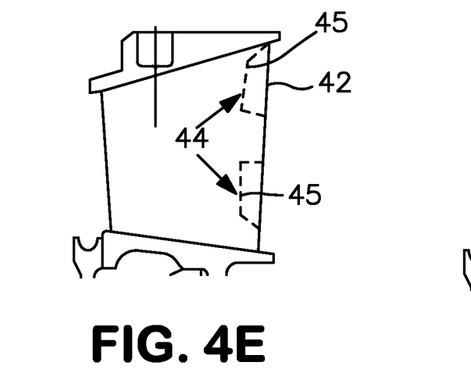
Figure 4F:
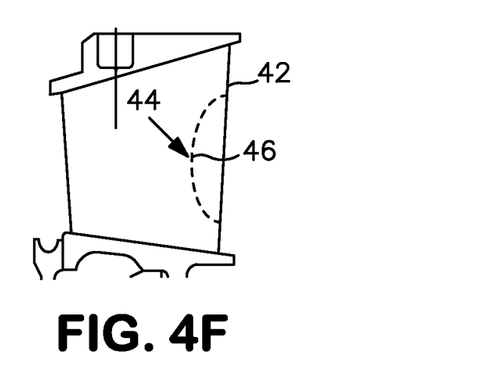

FIGS. 4D-4F illustrate different modifications that may be made to the vane trailing edge in a spanwise direction. The dotted lines in each of FIGS. 4D-4F show a modified trailing edge 44 and the solid lines 42 illustrate the original trailing edges. In FIG. 4D, the trailing edge has been modified by reducing the chord of the airfoil 43 and/or by changing the angle of the trailing edge. In FIG. 4E, the trailing edge has been provided with cutback portions 45. In FIG. 4F, the trailing edge has been provided with an arcuate shaped region 46.

In an embodiment, computation fluid dynamic (CFD) analysis may be used to optimize the modification in the vane exit angle $\alpha_1$ to lower the energy level extracted by the blade by disturbing the flow pressure field such that Eq. (3) is minimized. Along the vane TE span, maximum vane modification occurs at a location corresponding to the maximum mode shape deflection on the blade. The nozzle vane exit angle modification is guided in the direction of shifting the blade pressure loading toward the leading edge away from the blade anti-node by effectively minimizing the term on the right hand side of Eq. (3):

$$P^* \dot{X} \cos \theta \quad (8)$$

An additional embodiment comprises performing CFD analysis to modify local pressure field by air bleed at nozzle vane trailing edge (TE). Air bleed at the nozzle trailing edge location produces local turbulence which prevents the building up of fluid energy extracted by the blade. The number of air bleeds may be limited to a few locations distributed in the tangential direction. The two methods described herein may be used separately or in conjunction.

Due to design constraints, such as the geometric constraint of components, performance requirements, space limitations, and the not well separated eigen nature of blade frequencies, it is not unusual to encounter situations in which a set of nozzle vane configuration that result in no turbine blade interference, is not available. In such situations, a reduction in blade dynamic stress, will result in increased durability of the turbine.

Figure 6:
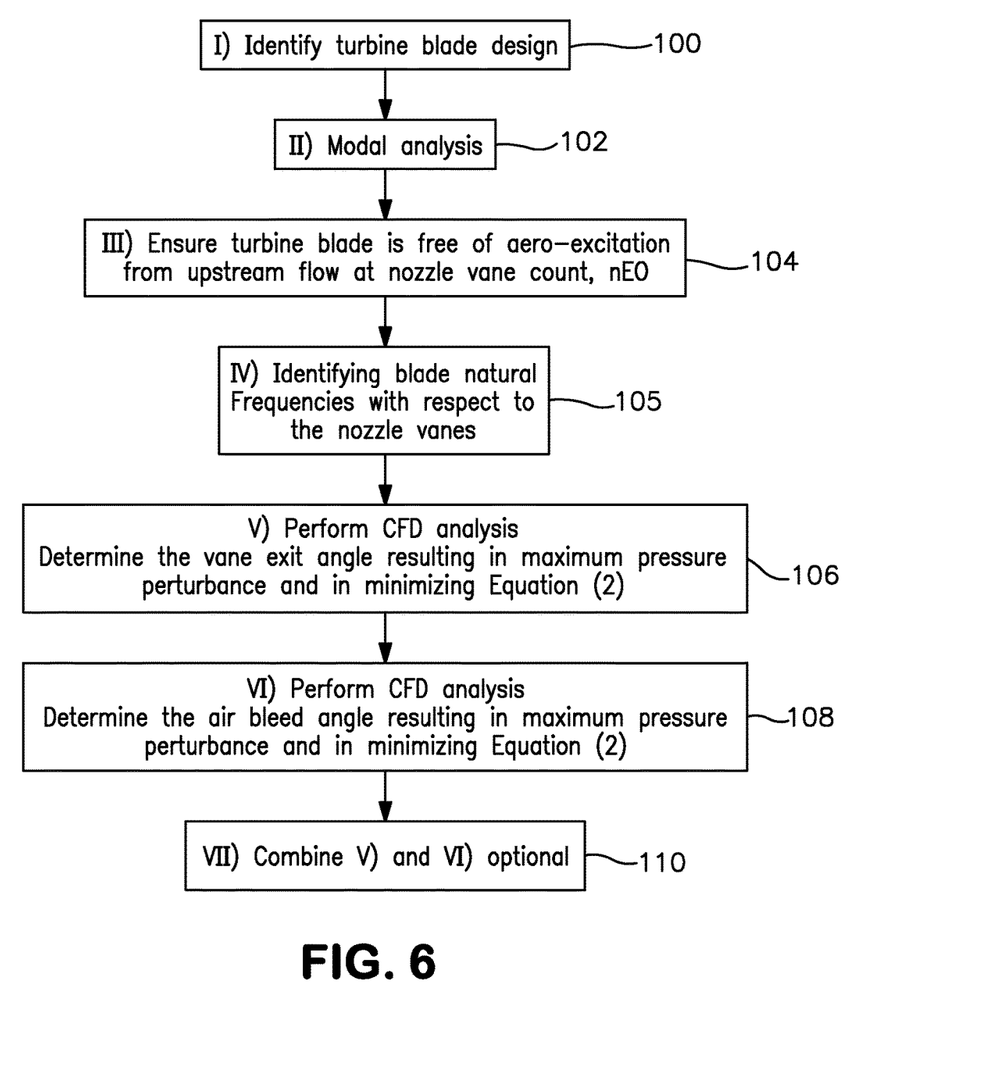
FIG. 6 is a flow chart illustrating the method described herein.

In an embodiment, a method for reducing the dynamic stress on a turbine blade by interrupting the harmonic building up of energy transferred from fluid to blade for an existing nozzle with equally spaced vanes of a radial or axial turbine assembly configuration is outlined in FIG. 6. The method broadly comprises (1) identifying a turbine blade design of the turbine nozzle assembly 100; (2) performing modal model analysis of at least one of the turbine blades in the turbine blade design 102; (3) reducing aerodynamic impact by ensuring that each of the turbine blade is free of aero-excitation from an upstream flow at the vanes in an operating speed range 104; (4) identifying the blade natural frequencies with respect to the nozzle vanes 105; and (5) modifying the trailing edge of at least one of the vanes to reduce the excitation amplitudes affecting turbine blade durability in the turbine assembly. The trailing edge modification may be done by performing a CFD analysis 106 to determine the vane exit angle resulting in maximum pressure perturbance and in minimizing $P(\omega)$ in Equation (2). The turbine blade dynamic characteristics may be affected by the pressure field disturbance as it passes the nozzle vanes. The vane trailing edge exit angle may be modified either by EDM or machining, in the direction of increasing or decreasing $\alpha_1$ to minimize Eq. (3). In an embodiment, CFD analysis 108 may be performed to determine the air bleed angle resulting in maximum pressure perturbance and in minimizing $P(\omega)$ in Eq. (2). In this embodiment, the bleed air from a secondary air system can be introduced to the vane trailing edge through (a) a turbine shroud and/or (b) through modification of an internal vane cooling system. In still another embodiment, as shown in box 110, both the CFD analysis to determine the vane exit angle and the CFD analysis to determine the air bleed angle may optionally be combined.

Embodiments are related not only to an axial turbine nozzle assembly with vanes equally spaced in the tangential direction, but also to a similar structure such as a radial turbine nozzle assembly. An embodiment includes influencing the aero-dynamic excitation amplitude on frequency of a given mode of vibration by only modifying the vane exit angle $\alpha_1$ of an equally spaced configuration such that the resultant disturbance pressure load acting on the chosen mode shape of the blade, for either axial or radial turbine blade-types, results in acceptable blade vibratory stresses in order to improve blade durability. An additional embodiment influences the aerodynamic excitation amplitude on frequency of a given mode of vibration by air bleed to the nozzle vane trailing edge of an equally spaced configuration, such that the resultant disturbance pressure load acting on the chosen mode shape of the blade, axial or radial turbine blade type, results in acceptable blade vibratory stresses in order to improve the blade durability. A further embodiment influences the excitation amplitude on a frequency of a given mode of vibration by only reducing the amplitude coefficients of the Fourier series representing the aerodynamic forcing function.

The method of the present invention may be performed by a computer processor, computer processing systems, or processing circuits.

An embodiment includes reducing equally spaced turbine nozzle vane excitation. While aspects of the invention have been described in the context of specific embodiments thereof, other unforeseen alternatives, modifications, and variations may become apparent to those skilled in the art having read the foregoing description. Accordingly, it is intended to embrace those alternatives, modifications, and variations as to fall within the broad scope of the invention and claims.

What is claimed is:

1. Method for reducing excitation amplitudes affecting turbine blade durability in a turbine nozzle assembly having a plurality of vanes and turbine blades, comprising the steps of:

identifying a turbine blade design of said turbine nozzle assembly;

performing a modal model analysis of at least one of said plurality of turbine blades in said turbine blade design using a computer;

reducing aerodynamic impact by ensuring that each of said plurality of turbine blades is free of aero-excitation from an upstream flow at said vanes in an operating speed range;

identifying blade natural frequencies with respect to said plurality of vanes using said computer;

determining at least one modification to a trailing edge of at least one of said plurality of vanes to reduce said excitation amplitudes;

modifying at least one of said plurality of vanes at said trailing edge;

modifying a local pressure field by use of an air bleed air flow proximate said trailing edge;

modifying a vane exit angle in a direction of shifting blade pressure loading toward a leading edge of said at least one of said plurality of turbine blades away from a blade anti-node; and limiting a number of air bleeds distributed in a few locations on said at least one of said plurality of vanes.

2. The method of claim 1, wherein said modifying at least one of said plurality of vanes at said trailing edge comprises altering an angle at which a flow of gas enters said plurality of turbine blades and interrupts energy build up.

3. The method of claim 1, wherein said determining comprises performing a CFD analysis to determine a vane exit angle resulting in maximum pressure perturbance and minimizing $P(\omega)$.

4. The method of claim 3, further comprising performing a CFD analysis to determine an air bleed angle resulting in maximum pressure perturbance and in minimizing said $P(\omega)$.

5. The method of claim 1, further comprising introducing said air bleed air flow to said trailing edge through at least one of a turbine shroud and an internal vane cooling system.

6. The method of claim 1, further comprising performing a CFD analysis to determine an air bleed angle resulting in maximum perturbance and in minimizing $P(\omega)$.

7. The method of claim 1, wherein said trailing edge modifying step comprises modifying said trailing edge in a spanwise direction.

8. The method of claim 1, wherein said trailing edge modifying step comprises modifying an airfoil with said trailing edge to have a reduced chord.

9. The method of claim 1, wherein said trailing edge modifying step comprises including cut back portions in said trailing edge.

10. The method of claim 1, wherein said trailing edge modifying step comprises including an arcuate portion in said trailing edge.

* * * * *